(12) United States Patent
Bi et al.

(10) Patent No.: US 6,515,977 B2
(45) Date of Patent: *Feb. 4, 2003

(54) DE-ASSIGNING SIGNALS FROM THE FINGERS OF A RAKE RECEIVER

(75) Inventors: Qi Bi, Morris Plains, NJ (US); Douglas Streeter Daudelin, Lincoln Park, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,582

(22) Filed: Nov. 5, 1997

(65) Prior Publication Data

US 2001/0010688 A1 Aug. 2, 2001

(51) Int. Cl.$^7$ .......................... H04Q 7/00; H04B 7/216; H04B 17/02; H04B 17/00
(52) U.S. Cl. .................... 370/342; 370/335; 370/332; 455/135; 455/226.3
(58) Field of Search .................... 370/332, 335, 370/252, 342, 330, 346, 320, 465, 350, 331; 455/132, 133, 134, 135, 506, 504, 226.3; 375/200, 201, 206, 347, 207, 349, 208, 209, 210

(56) References Cited

U.S. PATENT DOCUMENTS

| 5,216,692 A | * | 6/1993 | Ling ........................... 375/1 |
| 5,237,586 A | * | 8/1993 | Bottomley ................. 370/342 |
| 5,754,583 A | * | 5/1998 | Eberhardt et al. ......... 375/200 |
| 5,799,004 A | * | 8/1998 | Keskitalo et al. .......... 370/335 |
| 5,815,801 A | * | 9/1998 | Hamalainen et al. ........ 455/63 |
| 5,881,058 A | * | 3/1999 | Chen ......................... 370/335 |
| 5,889,768 A | * | 3/1999 | Storm et al. ............... 370/320 |
| 5,926,503 A | * | 7/1999 | Kelton et al. .............. 375/206 |
| 5,987,012 A | * | 11/1999 | Bruckert et al. ........... 370/331 |
| 6,009,129 A | * | 12/1999 | Kenney et al. ............ 375/346 |
| 6,072,807 A | * | 6/2000 | Daudelin .................... 370/465 |
| 6,078,611 A | * | 6/2000 | La Rosa et al. ........... 375/206 |
| 6,084,904 A | * | 7/2000 | Wang et al. ............... 375/130 |
| 6,345,078 B1 | * | 2/2002 | Basso ......................... 375/349 |

* cited by examiner

Primary Examiner—Kwang Bin Yao
Assistant Examiner—Hanh Nguyen
(74) Attorney, Agent, or Firm—DeMont & Breyer, LLC

(57) ABSTRACT

A technique for de-assigning signals from the fingers of a rake receiver is disclosed. In general, embodiments of the present invention place more stringent standards on signals that have been newly assigned to a finger and may be spurious and place less stringent standards on mature signals that have proved themselves over time but may be experiencing only a temporary signal quality shortfall. Illustrative embodiments of the present invention accomplish this goal using one or more of four techniques. The first technique de-assigns a signal from a finger when a measure of signal quality of the signal crosses a threshold, while changing the threshold as a function of the duration that the signal has been assigned to the finger.

40 Claims, 6 Drawing Sheets

100

DE-ASSIGNING SIGNALS FROM THE FINGERS OF A RAKE RECEIVER

FIELD OF THE INVENTION

The present invention relates to telecommunications in general, and, more particularly, to a method and apparatus for de-assigning signals from the fingers of a rake receiver.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may be known also as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to local- and long-distance telephone offices (e.g., local-office 130, local-office 138 and toll-office 140). Wireless Switching Center 120 is responsible for, among other things, establishing and maintaining calls between wireless terminals and between a wireless terminal and a wireline terminal, which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

Typically, the signal transmitted by a wireless terminal to a base station is radiated omni-directionally from the wireless terminal. Although some of the signal that is transmitted radiates in the direction of the base station and reaches the base station in a direct path, if one exists, most of the transmitted signal radiates in a direction other than towards the base station and is never received by the base station. Often, however, signals that radiate initially in a direction other than towards the base station strike an object and are reflected towards, and are received by, the base station. Thus, a signal can radiate from the wireless terminal and be received by the base station via multiple signal paths.

FIG. 2 depicts a schematic illustration of wireless terminal 101-1 as it transmits to base station 103-1. Signal 107-1 is received by base station 103-1 directly. Signal 107-2, signal 107-3 and signal 107-4 arrive at base station 103-1 after radiating initially in a direction other than towards base station 103-1 and only after reflecting off of an object, such as buildings 105-2 through 105-4, respectively. Signals 108-1 through 108-4 radiate from wireless terminal 101-1 but never reach base station 103-1.

Because each of the four signals arrives at base station 103-1 after having traveled a different path, each of the four signals arrives phase-shifted with respect to each other. And furthermore, depending on the length of the path traveled and whether the signal is reflected off an object before reaching base station 103-1, the signal quality (e.g., the average power of an amplitude-modulated signal, the signal-to-noise ratio, absolute power in dBm, etc.) of each signal is different when received. This is partially due to the fact that when a signal is reflected off of an object, the degree to which the signal is attenuated is a function of, among other things, the angle at which the signal is incident to the object and the geometric and dielectric properties of the object.

FIG. 3a depicts an illustrative graph of the average power of an amplitude-modulated signal as a function of time for the direct path signal 107-1 in FIG. 2, which typically arrives at base station 103-1 in the best condition of all the constituent signals. FIG. 3b, 3c and 3d depict illustrative graphs of the average power of an amplitude-modulated signal as a function of time for the three reflected signals, signal 107-2 through signal 107-4, respectively, as they arrive at base station 103-1 after signal 107-1. Typically, signals 107-2 through 107-4 are phase-shifted with respect to signal 107-1, because they each travel a longer path than signal 107-1, and are attenuated to varying degrees, with respect to signal 107-1. Although only four signals are depicted in FIG. 2 as reaching base station 103-1, in practice, many signals typically reach base station 103-1, each having traveled a different path, such that they interfere to form a composite signal at base station 103-1. This phenomenon is known as the "multipath" problem. To simplify the illustration, the relative phase-shift of the constituent signals has been confined to an integral number of wavelengths of the carrier frequency. The resulting composite signal is shown in FIG. 3e.

In typical analog wireless systems in the prior art, the presence of secondary reflected signals at the receiver interfere with the direct path signal. When the system carries television signals, the reflected multipath signals can appear as "ghosts" on the screen of older television sets.

In a code-division multiple access ("CDMA") wireless telecommunications system each radio receiver endeavors to identify and isolate the highest-quality constituent signals incident on the receiver and to demodulate and combine them to estimate the transmitted signal. As is well-known in the prior art, this process is conducted with, among other things, a finger-assignor and a rake receiver. The finger-assignor analyzes the incoming composite signal, in well-known fashion, and attempts to identify the strongest constituent signals in the composite signal to the rake receiver. The rake receiver isolates and demodulates each of the identified strongest constituent signals, and then combines the demodulation result from each constituent signal, in well-known fashion, to produce a better estimate of the transmitted signal than could be obtained from any single constituent signal. To accomplish this, a rake receiver comprises a plurality, but finite number, of individual receivers, known as "fingers," each of which isolates and demodulates one constituent signal.

As the wireless terminal moves, the relative signal quality and phase-shift of the constituent signals changes, some-times considerably. Received constituent signals can disappear, new constituent signals can appear, and existing constituent signals can merge or diverge. The signal quality of a constituent signal can suffer radical momentary changes, which make it appear for a time that the constituent signal no longer exists, although it quickly reappears. Such changes can be due to, for example, Rayleigh fading, or the transmitter passing behind an obstruction. Furthermore, the current receiver techniques in some CDMA technologies (e.g., IS-95 CDMA Rate Set 1) are such that usable constituent signals can have signal qualities so close to that of the noise floor that often random fluctuations in the noise floor can appear to the finger-assignor to be genuine signal constituents. These are called spurious signals, and, when assigned to the rake receiver: (1) degrade the quality of the demodulator's output, and (2) take up a finger in the receiver which could otherwise be profitably assigned to a genuine constituent signal.

Because it is well-known to those skilled in the art that the inclusion of spurious signals in the combination process is detrimental to the operation of the system, a technique has been developed for addressing the issue. In accordance with this technique, constituent signals are identified and assigned to available fingers in well-known fashion. However, a newly assigned constituent signal is initially put on probation—meaning that the newly assigned constituent signal is not included in the combination process until the signal has maintained a measure of signal quality above a threshold, C, for a predetermined amount of time. Thereafter, the signal is included in the combination process. The probation period is advantageous in that it is statistically improbable for a spurious signal to meet the signal quality threshold for the predetermined amount of time and thus it is statistically improbable that a spurious signal will be included in the combination process.

FIG. 4 depicts a graph of the signal quality as a function of time of a constituent signal that has been assigned to a finger at $t_0$. Because the signal maintains a signal quality at all times above the threshold, C, until time $t_p$, the signal is included in the combination process after time $t_p$.

A constituent signal may be de-assigned for various reasons. One reason a constituent signal may be de-assigned is that it is to be replaced with a constituent signal of apparently higher quality. Another reason is that the de-assigned constituent signal may have been determined to have become spurious. According to prior art, the constituent signal in FIG. 4 is de-assigned for this latter reason because its signal quality fell below the rejection threshold, R, for time $t_r$.

Despite its advantages, the prior art has several disadvantages. First, the prior art does not allow the utilization of genuine signals in the combination process until after the probation period, which deprives the combination process of valuable information. This disadvantage could be ameliorated by shortening the probation period, but shortening the probation period would admit a significant number of spurious signals into the combination process. Furthermore, by shortening the probation period, the de-assignment process is compromised in attempting to satisfy the conflicting goals of de-assigning spurious signals quickly, while retaining genuine signals through momentary periods of degraded signal quality.

Therefore, the need exists for an improved technique for de-assigning signals from the fingers of a rake receiver.

SUMMARY OF THE INVENTION

Some embodiments of the present invention are capable of de-assigning signals from the fingers of a rake receiver without some of the costs and disadvantages of techniques in the prior art. In particular, some embodiments of the present invention de-assign spurious signals from the fingers of a rake receiver quickly and do not de-assign genuine signals in momentary periods of degraded signal quality.

Some embodiments of the present invention are advantageous because they enable the rake receiver to, on average, have a larger number of genuine constituent signals and a smaller number of spurious signals included in the combination process, which results in a higher-quality estimate of the transmitted signal. Furthermore, some embodiments of the present invention enable the inclusion of newly-assigned constituent signals in the combination process without a probation period.

Because embodiments of the present invention can substantially affect the traffic capacity of a wireless telecommunications system, it will be clear to those skilled in the art that embodiments of the present invention can affect the cost-effectiveness of an entire wireless telecommunications system.

In general, embodiments of the present invention accomplish this goal by: (1) placing more stringent standards on newly assigned signals, which may be spurious, and (2) placing less stringent standards on mature signals that have proved themselves over time but may experience only a temporary signal quality shortfall.

Illustrative embodiments of the present invention accomplish this goal by using one or more of the following four techniques.

The first technique de-assigns a signal from a finger when a measure of signal quality of the signal crosses a threshold, while changing the threshold as a function of the duration that the signal has been assigned to the finger.

The second technique de-assigns the signal from the finger when a time-average measure of signal quality of the signal crosses a threshold, while changing the length of time in which the time-average measure of signal quality is determined as a function of the duration that the signal has been assigned to the finger.

The third technique de-assigns the signal from the finger when a measure of signal quality of the signal spends more than a percentage of time below a threshold, while changing the percentage as a function of the duration that the signal has been assigned to the finger.

The fourth technique de-assigns the signal from the finger when a measure of signal quality of the signal spends more than a percentage of time below a threshold during an interval of time of a first length, while changing the first length as a function of the duration that the signal has been assigned to the finger.

DETAILED DESCRIPTION

Figure 1:
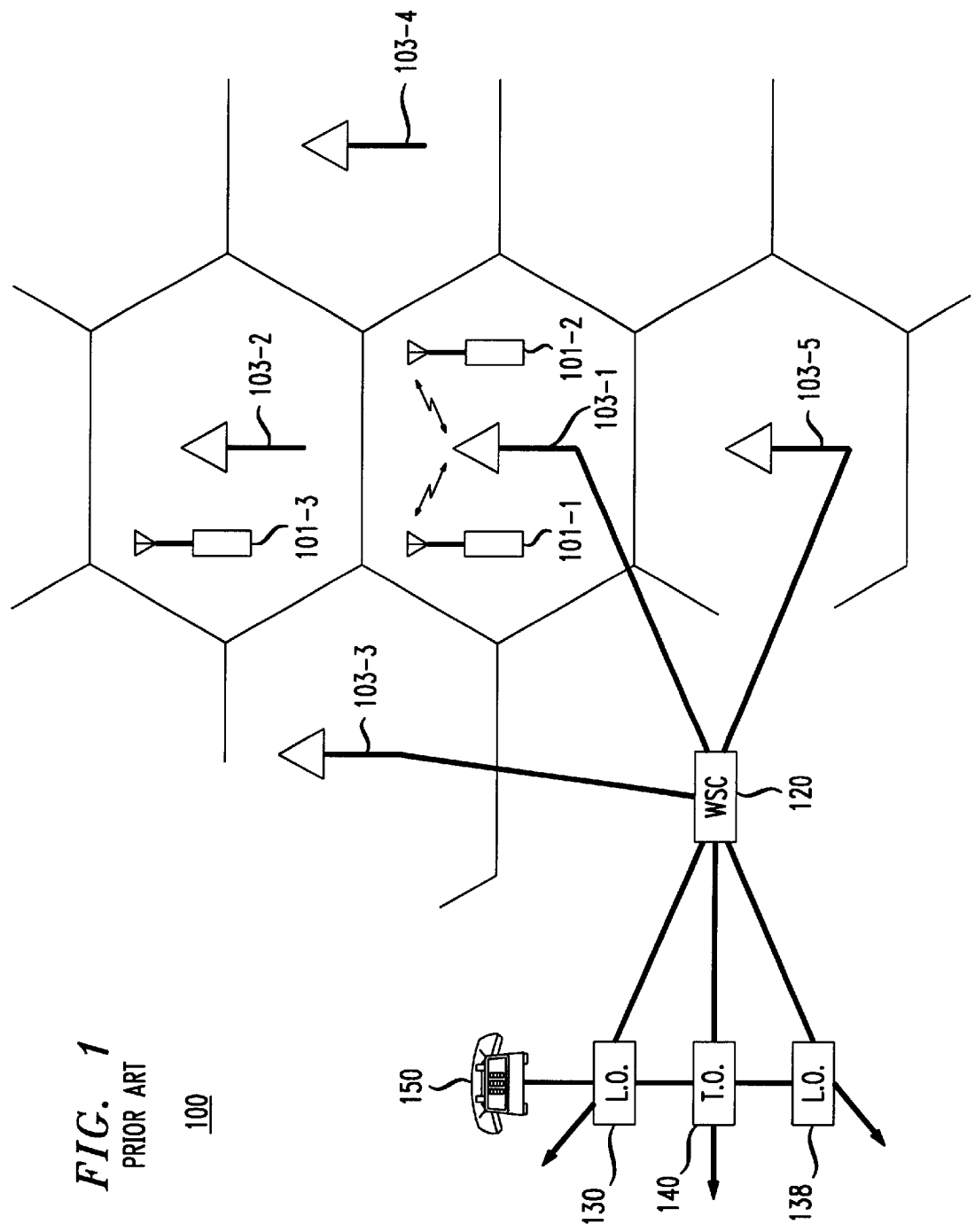
FIG. 1 depicts a schematic drawing of a wireless telecommunications system in the prior art.
Figure 2:
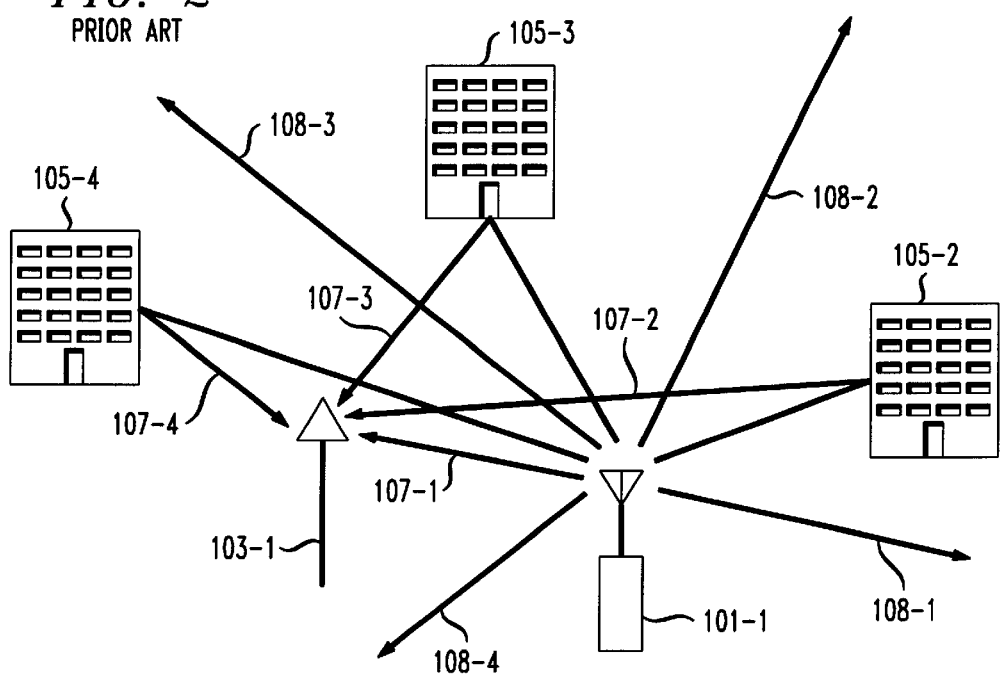
FIG. 2 depicts a schematic drawing of a wireless base station receiving a multipath signal transmitted by a wireless terminal in the prior art.
Figure 3A:
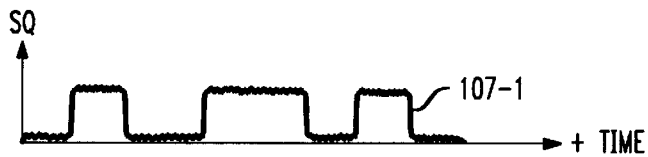
FIGS. 3a, 3b, 3c, and 3d each depict a graph of an illustrative constituent of a multipath signal.
Figure 3B:
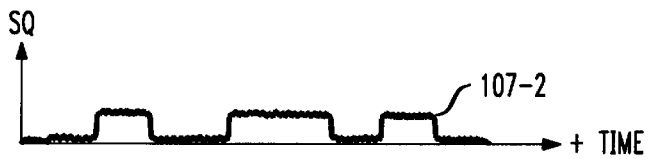
Figure 3C:
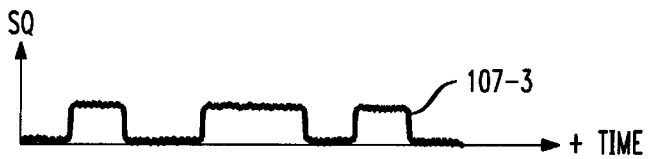
Figure 3D:
Figure 3E:
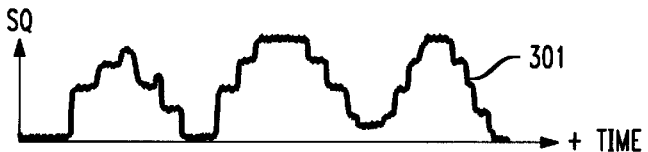
FIG. 3e depicts a graph of an illustrative multipath signal.
Figure 4:
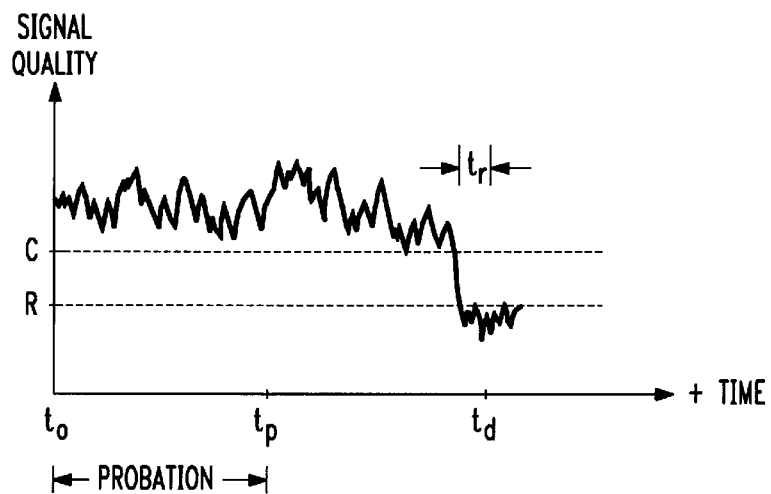
FIG. 4 depicts a graph of an illustrative constituent signal and the temporal and signal quality thresholds that govern the use and de-assigning of the illustrative constituent signal.
Figure 5:
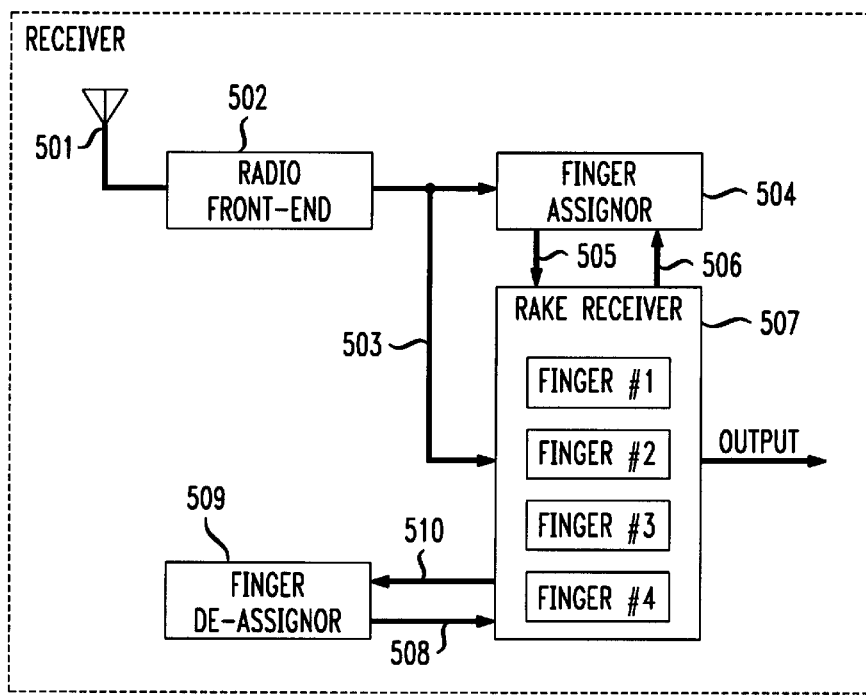
FIG. 5 depicts a block diagram of a receiver in accordance with an illustrative embodiment of the present invention.

FIG. 5 depicts a block diagram of receiver 500 in accordance with the illustrative embodiment of the present invention. Receiver 500 can be in either a wireless base station or in a wireless terminal and advantageously receives and processes direct sequence spread spectrum signals transmitted as part of a code-division multiple access ("CDMA") telecommunications system.

Receiver 500 illustratively comprises: antenna 501, radio front-end 502, finger assignor 504, rake receiver 507 and finger de-assignor 509. Antenna 501 advantageously receives a composite multipath signal, like that shown at 301 in FIG. 3, in well-known fashion. Radio front-end 502 receives the composite signal from antenna 501 and amplifies and down-converts it also in well-known fashion. The composite signal leaves radio front-end 502 and is received by: (1) finger assignor 504 and (2) rake receiver 507.

In FIG. 5, finger assignor 504, rake receiver 507 and finger de-assignor 509 are shown as separate and distinct elements for the purpose of accentuating the differences in the functions they perform. In practice, however, the three can be implemented as separate components or as a single component, in well-known fashion. Furthermore, it will be clear to those skilled in the art that each of the three can be implemented in special-purpose hardware, or as appropriately-programmed general-purpose computing hardware, or as a combination of the two.

Rake receiver 507 advantageously comprises four fingers, in well-known fashion. It will be clear to those skilled in the art how to make and use embodiments of the present invention with other than four fingers. Rake receiver 507 advantageously receives as its inputs: (1) the composite signal on lead 503, (2) orders from finger assignor 504 to assign a signal to a finger, and (3) orders from finger de-assignor 509 to de-assign a signal from a finger, in well-known fashion. Each finger in rake receiver 507 is, at any moment, either unassigned (i.e., not demodulating any signal) or is assigned and demodulating a constituent signal of the composite signal. The output of each assigned finger can be included in the combination process, in well-known fashion, immediately upon being assigned to the finger. In other words, in accordance with the illustrative embodiment of the present invention, no constituent signal must survive a probation period before being included in the combination process. It will be clear to those skilled in the art how to make and use rake receiver 507.

Finger assignor 504 advantageously receives as its inputs: (1) the composite signal on lead 503 and (2) an indication from rake receiver 507 of which fingers are currently assigned and which are unassigned, and (3) an indication, from rake receiver 507 of the signal quality of each assigned constituent signal. Finger assignor 504 advantageously analyzes the composite signal and searches for strong constituent signals that are appropriate to assign to a finger, in well-known fashion. Then, when appropriate, finger assignor 504 assigns a signal to a finger, in well-known fashion. It will be clear to those skilled in the art how to make and use finger-assignor 504 and rake receiver 507.

Finger de-assignor 509 advantageously receives as its inputs: (1) an indication from rake receiver 507 of which fingers are currently assigned and which are unassigned, and (2) an indication of the signal quality of each assigned constituent signal. Finger de-assignor 509 advantageously analyzes the assigned constituent signals and determines when one or more of the assigned constituent signals is spurious. When finger de-assignor 509 determines that an assigned constituent signal is spurious, then finger de-assignor 509 orders rake receiver 507 to de-assign the signal from the associated finger.

It will be clear to those skilled in the art that embodiments of the present invention can de-assign a signal from a finger for other reasons, in well-known fashion, in addition to that of determining that an assigned constituent signal is spurious.

In accordance with the illustrative embodiment of the present invention, finger de-assignor 509 attempts to de-assign spurious signals more quickly than does the prior art, and also attempts to avoid de-assigning genuine signals more slowly, especially when a genuine signal experiences a brief period of low signal quality. To accomplish this, finger de-assignor 409 can employ one of three techniques:

(1) the Temporal Threshold Technique, (2) the Temporal Time-Average Technique, and (3) the Temporal Percent-Below-Threshold Technique.

Each of these three techniques is described below.

Temporal Threshold Technique—In accordance with this technique, finger de-assignor 509 de-assigns a signal from a finger when a measure of signal quality of the signal crosses a threshold, while changing the threshold as a function of time. Although the illustrative embodiment changes the threshold as a function of the duration that the signal has been assigned to the finger, it will be clear to those skilled in the art that the threshold can be changed as a function of other intervals that might be more relevant to the particular circumstances of interest. The measure of signal quality may be, for example, signal-to-noise ratio ("SNR") or absolute power in dBm or any other measure of signal quality. Advantageously, the threshold decreases as a function of the duration that the signal has been assigned to the finger. The purpose of decreasing the threshold as a function of the duration that the signal has been assigned to the finger is to effectively place more stringent standards of quality on new, potentially spurious signals, and to be more forgiving of established signals, which can disappear temporarily because, for example, the transmitted signal is temporarily obstructed.

Figure 6:
FIG. 6 depicts a graph of the signal quality of a signal as a function of time in accordance with the illustrative embodiment of the present invention.

FIG. 6 depicts a graph of the signal quality of an illustrative signal as a function of time where the signal has been assigned to the finger at time $t=t_0$. The threshold above which the signal must remain in order not to be de-assigned begins at the value, $R_1+R_2$, but decreases logarithmically towards the asymptote $R_2$. For example, the threshold may equal:

$$R_1 e^{(-t/\tau_c)} + R_2 \qquad (\text{Eq. 1})$$

where $\tau_c$ is the logarithmic time-constant of decay, in well-known fashion. Note that at time $t_d$ in FIG. 6, the signal finally falls below the threshold and is de-assigned, and that had a fixed threshold at value $R_1+R_2$ been the standard, the signal would have been de-assigned much earlier than $t_d$.

Figure 7:
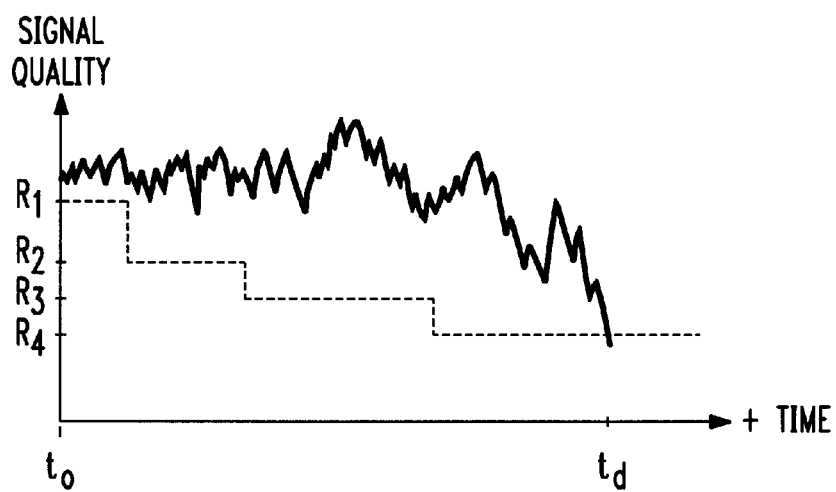
FIG. 7 depicts another graph of the signal quality of a signal as a function of time in accordance with the illustrative embodiment of the present invention.

FIG. 7 depicts a graph of the signal quality of an illustrative signal as a function of time, where the signal has been assigned to the finger at time $t=t_0$. The threshold above which the signal must remain in order not to be de-assigned begins at the value, $R_1$, but decreases in discrete steps according to a schedule that is dependent or independent of the signal quality of the signal.

Note that for the signals shown in both FIG. 6 and FIG. 7, had the threshold, R, been fixed, as in the prior art, both signals would have been de-assigned earlier than $t_d$ and the combination process would have been deprived of the valuable information contained in the signals.

Temporal Time-Average Technique—In accordance with this technique, finger de-assignor 509 de-assigns a signal from a finger when a time-average measure of signal quality of the signal crosses a threshold, while changing the length of time in which the time-average measure of signal quality is determined as a function of time. Although the illustrative embodiment changes the length of time in which the time-average measure of signal quality is determined as a function of the duration that the signal has been assigned to the finger, it will be clear to those skilled in the art that the length of time in which the time-average measure of signal quality is determined can be changed as a function of other intervals that might be more relevant to the particular circumstances of interest. Advantageously, the threshold remains a constant.

As with the Temporal Threshold Technique, the measure of signal quality may be, for example, signal-to-noise ratio ("SNR") or absolute power in dBm or any other measure of signal quality. Advantageously, the length of time in which the time-average measure of signal quality is determined increases as a function of the duration that the signal has been assigned to the finger.

As with the Temporal Threshold Technique, the purpose of changing the length of time in which the time-average measure of signal quality is determined is to effectively place more stringent standards of quality on new, potentially spurious signals, and to be more forgiving of established signals.

The time-average measure of signal quality, ASQ(t), of the signal at time t, is defined as:

$$ASQ(t) = \frac{1}{\Delta t} \int_{t-\Delta t}^{t} SQ(t) dt \qquad (\text{Eq. 2})$$

where SQ(t) is the instantaneous measure of signal quality and $\Delta t$ is the length of time over which the time-average measure of signal quality is determined. Advantageously, $\Delta t$ increases logarithmically as a function of the measure of the duration that the signal has been assigned to the finger. For example, $\Delta t$ may be defined as:

$$\Delta t = t_{max}(1 - e^{(-t/\tau_c)}) + t_{min} \qquad (\text{Eq. 3})$$

where $t_{min}$ is the minimum interval during which the time-average is measured, $t_{max}+t_{min}$ is the maximum interval during which the time-average is measured, and $\tau_c$ is the logarithmic time-constant of decay.

Figure 8:
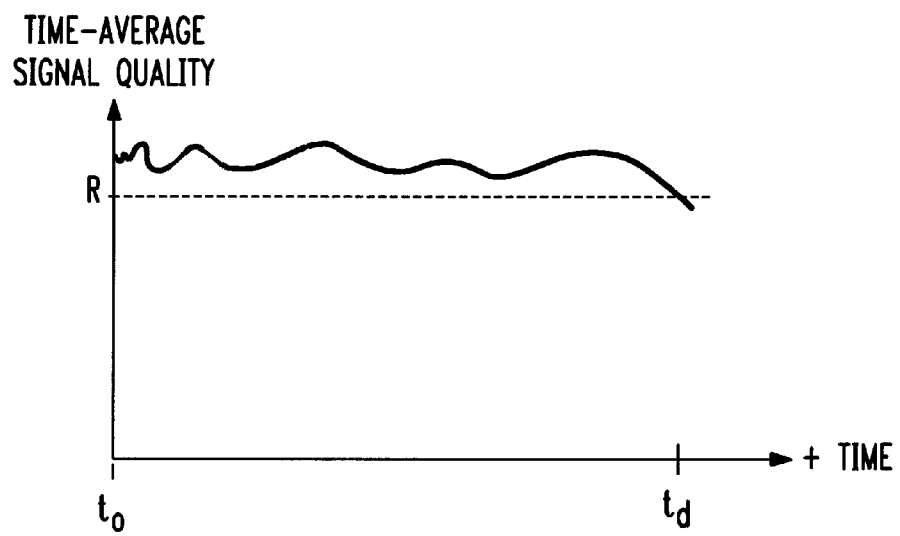
FIG. 8 depicts another graph of the time-average signal quality of a signal as a function of time in accordance with the illustrative embodiment of the present invention.

Alternatively, $\Delta t$ increases in discrete steps according to a schedule that is dependent or independent of the signal quality of the signal. FIG. 8 depicts a graph of the time-average measure of signal quality as a function of time, where the signal was assigned to the finger at time $t=t_0$. In general, if the fluctuations in signal quality per unit time of the signal remain constant, the time-average measure of signal quality will be less volatile over time because of the effect of the law of large numbers.

Temporal Percent-Below-Threshold Technique—In accordance with this technique, finger de-assignor 509 de-assigns a signal from a finger when a measure of signal quality of the signal spends more than a percentage, P, of time below a threshold, R, during an interval of time of a first length, $\Delta t$, while changing either the percentage, P, or the first length, $\Delta t$, or both, as a function of time. Although the illustrative embodiment changes the percentage, P, or the first length, $\Delta t$, or both, as a function of the duration that the signal has been assigned to the finger, it will be clear to those skilled in the art that the percentage, P, or the first length, $\Delta t$, or both, can be changed as a function of other intervals that might be more relevant to the particular circumstances of interest.

Advantageously, the threshold, R, remains a constant while the percentage, P, increases or the first length, $\Delta t$, increases, or both increase as a function of the duration that the signal has been assigned to the finger.

As with the Temporal Threshold Technique and the Temporal Time-Average Technique, the measure of signal quality may be, for example, signal-to-noise ratio ("SNR") or absolute power in dBm or any other measure of signal quality.

As with the Temporal Threshold Technique and the Temporal Time-Average Technique, the purpose of changing the percentage, P, or the first length, $\Delta t$, or both is to effectively place more stringent standards of quality on new, potentially spurious signals, and to be more forgiving of established signals.

The percentage time that the measure of signal quality spends below a threshold is defined as the total amount of time that the measure of signal quality has spent below the threshold during an interval of time of a first length, $\Delta t$, divided by $\Delta t$.

Advantageously the percentage, P, increases logarithmically as a function of the duration that the signal has been assigned to the finger. For example:

$$P = P_2(1 - e^{-t/\tau_c}) + P_1 \qquad (\text{Eq. 4})$$

where $P_1$, is the initial specified threshold at $t_0$, $P_1+P_2$ is the asymptotic specified threshold and $\tau_c$ is the logarithmic time-constant of decay.

Advantageously, the interval of time of first length $\Delta t$ can remain constant or can increase as a function of the duration that the signal has been assigned to the finger. For example:

$$\Delta t = t_{max}(1 - e^{(-t/\tau_c)}) + t_{min} \qquad (\text{Eq. 5})$$

where $t_{min}$ is the minimum interval of time, $t_{max}+t_{min}$ is the maximum interval of time, and $\tau_c$ is the logarithmic time-constant of decay.

Figure 9:
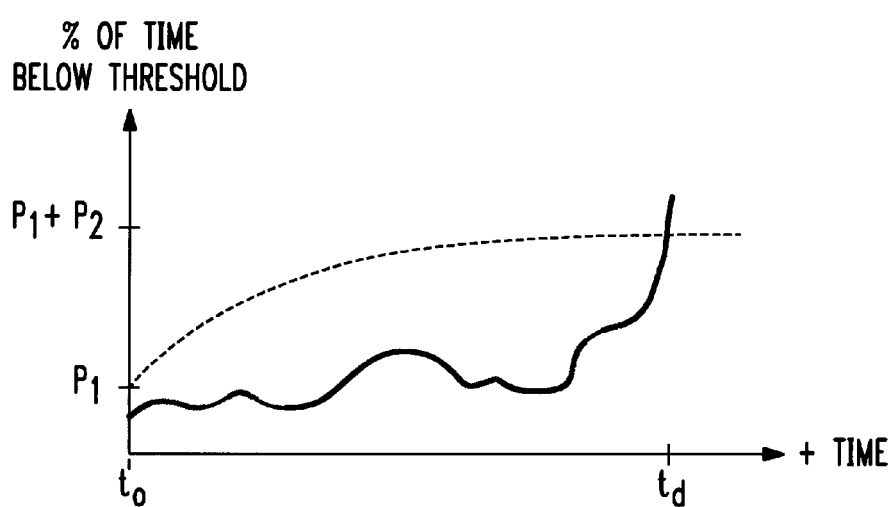
FIG. 9 depicts another graph of the percent of time below a threshold of a signal as a function of time in accordance with the illustrative embodiment of the present invention.

FIG. 9 depicts a graph of the percentage time that the measure of signal quality spends below a threshold as a function of time. In this case the percentage, P, increases logarithmically as a function of the duration that the signal has been assigned to the finger, while $\Delta t$ is a constant and the signal is de-assigned at time $t=t_d$.

Figure 10:
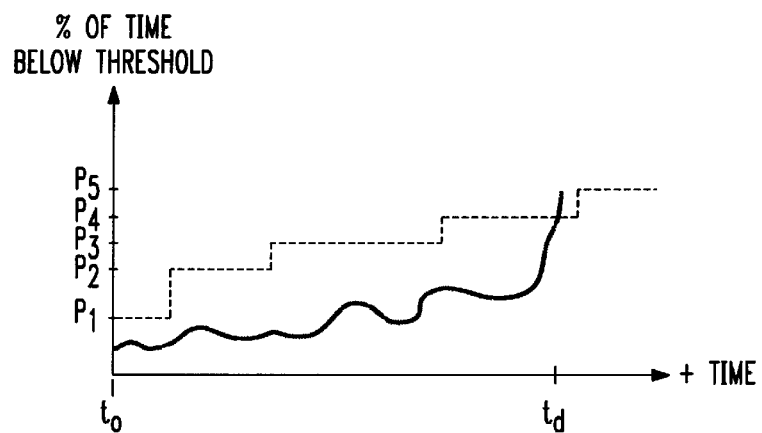
FIG. 10 depicts another graph of the percent of time below a threshold of a signal as a function of time in accordance with the illustrative embodiment of the present invention.

FIG. 10 depicts a graph of the percentage time that the measure of signal quality spends below a threshold as a function of time. In this case the percentage, P, increases in discrete steps according to a schedule that is dependent or independent of the signal quality of the signal, while $\Delta t$ is a constant. The signal is de-assigned at time $t=t_d$.

Figure 11:
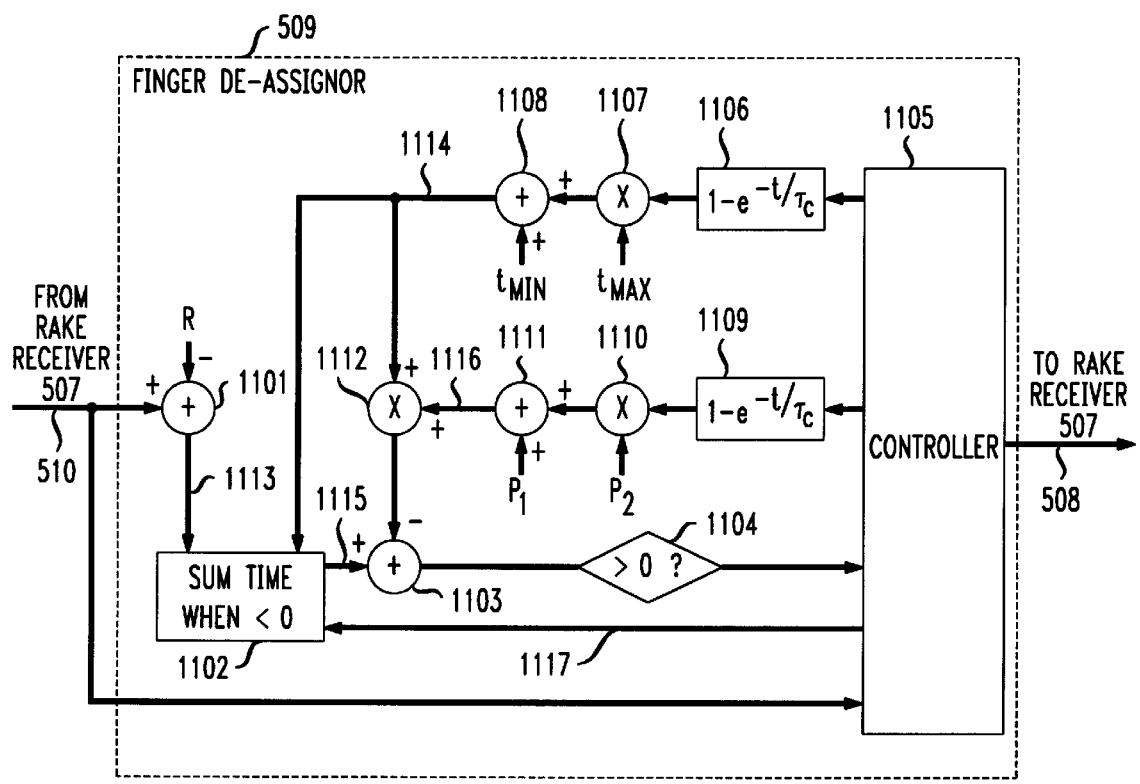
FIG. 11 depicts a block diagram of a finger de-assignor in accordance with an illustrative embodiment of the present invention.

FIG. 11 depicts a block diagram of a finger de-assignor in accordance with an illustrative embodiment of the present invention. The illustrative embodiment utilizes one variation of the Temporal Percent-Below-Threshold Technique to control the de-assignment of one finger of a rake receiver, wherein both the percentage, P, and the first length, $\Delta t$, are increased logarithmically as described in Eqs. 4 and 5 above. It will be clear to those skilled in the art how to extend this implementation to an arbitrary number of fingers. For example, when a rake receiver contains four fingers, finger de-assignor 509 could contain four sets of the apparatus shown in FIG. 11, each set controlling the de-assignment of one of the fingers.

Controller 1105 receives from rake receiver 507 over lead 510 information about whether the monitored finger is assigned. When a finger is newly assigned, blocks 1106 and 1109 are initialized by controller 1105 and begin to generate a logarithmically increasing value as a function of the length of time assigned, according to Eqs. 4 and 5. Although the values generated by blocks 1106 and 1109 in the implementation depicted in FIG. 11 are identical, it is to be understood that the values generated by those blocks could be generated by different time constants, or by different means altogether (e.g., producing values which increase in discrete steps as a function of time).

It can be seen that the value produced on lead 1114 is the time varying quantity $\Delta t$ of Eq. 5, and the value produced on lead 1116 is the time varying quantity P of Eq. 4.

Summer 1101 receives from rake receiver 507 over lead 510 a continuous measure of signal quality of the monitored finger, and continually produces on lead 1113 a value which is less than zero whenever the signal quality of the monitored finger is less than the threshold R. When a finger is newly assigned, block 1102 is initialized by controller 1105 and samples the first length $\Delta t$ value on input lead 1114, and then, during the ensuing first length $\Delta t$ interval, sums the amount of time which the value on lead 1113 spends less than zero. At the end of this first length $\Delta t$ time interval, block 1102 outputs on lead 1115 the total amount of time it has calculated the signal quality from the monitored finger was below threshold R.

The allowed amount of time which the monitored finger's signal quality may spend below the threshold during the preceding length of time $\Delta t$ is calculated by multiplier 1112 as $P*(\Delta t)$. Summer 1103 forms the difference between the measured amount of time the monitored finger spent below the threshold during the preceding first length $\Delta t$ time interval, and the allowed amount of time the signal quality for the monitored finger may spend below the threshold during the preceding first length $\Delta t$ time interval. In this embodiment, if this value at any time becomes greater than zero, as indicated by the output of comparator 1104, the signal assigned to the monitored finger has failed the percent-below-threshold criteria to remain assigned, and should be de-assigned.

Controller 1105 observes the output of comparator 1104, and de-assigns the monitored finger immediately upon observing the percent-below-threshold criteria has failed (that is, the time spent below the threshold during the preceding first length $\Delta t$ time interval exceeded the allowed amount of time). It does this by signaling rake receiver 507 over lead 508 to de-assign the finger. It should be noted that because the allowed amount of time below threshold value produced by multiplier 1112 is monotonically increasing, it is not necessary for controller 1105 to sample the output of comparator 1104.

Should the finger remain assigned, block 1102 continues by sampling the new $\Delta t$ value on input 1114, and proceeding as it had before when using the first length $\Delta t$ value.

This process repeats itself for the duration of time that the monitored finger is assigned, and restarts itself any time the monitored finger is reassigned. It will be clear to those skilled in the art how to make and use finger de-assignor 509 for an arbitrary number of fingers in accordance with one or more of the above-described techniques.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
    assigning a signal to a finger of a rake receiver;
    de-assigning said signal from said finger when a measure of signal quality of said signal crosses a threshold; and
    changing said threshold as a function of time.

2. The method of claim 1 wherein said threshold changes as a function of the duration that said signal has been assigned to said finger.

3. The method of claim 2 wherein said threshold decreases logarithmically as a function of the duration that said signal has been assigned to said finger.

4. The method of claim 2 wherein said threshold is decreases in discrete steps as a function of the duration that said signal has been assigned to said finger.

5. An apparatus comprising:
    a rake receiver comprising a finger;
    means for assigning a signal to said finger; and
    means for de-assigning said signal from said finger when a measure of signal quality of said signal crosses a threshold, and for changing said threshold as a function of time.

6. The apparatus of claim 5 wherein said threshold changes as a function of the duration that said signal has been assigned to said finger.

7. The apparatus of claim 6 wherein said threshold decreases logarithmically as a function of the duration that said signal has been assigned to said finger.

8. The apparatus of claim 6 wherein said threshold decreases in discrete steps as a function of the duration that said signal has been assigned to said finger.

9. A method comprising:
    assigning a signal to a finger of a rake receiver;
    de-assigning said signal from said finger when a time-average measure of signal quality of said signal crosses a threshold; and
    changing the length of time in which said time-average measure of signal quality is determined as a function of time.

10. The method of claim 9 wherein the length of time in which said time-average measure of signal quality is determined changes as a function of the duration that said signal has been assigned to said finger.

11. The method of claim 10 wherein the length of time in which said time-average measure of signal quality is determined increases logarithmically as a function of the duration that said signal has been assigned to said finger.

12. The method of claim 10 wherein the length of time in which said time-average measure of signal quality is determined increases in discrete steps as a function of the duration that said signal has been assigned to said finger.

13. An apparatus comprising:
a rake receiver comprising a finger;
means for assigning a signal to said finger; and
means for de-assigning said signal from said finger when a time-average measure of signal quality of said signal crosses a threshold, and for changing the length of time in which said time-average measure of signal quality is determined as a function of time.

14. The apparatus of claim 13 wherein the length of time in which said time-average measure of signal quality is determined changes as a function of the duration that said signal has been assigned to said finger.

15. The apparatus of claim 14 wherein the length of time in which said time-average measure of signal quality is determined increases logarithmically as a function of the duration that said signal has been assigned to said finger.

16. The apparatus of claim 14 wherein the length of time in which said time-average measure of signal quality is determined increases in discrete steps as a function of the duration that said signal has been assigned to said finger.

17. A method comprising:
assigning a signal to a finger of a rake receiver;
de-assigning said signal from said finger when a measure of signal quality of said signal spends more than a percentage of time below a threshold; and
changing said percentage as a function of time.

18. The method of claim 17 wherein said percentage changes as a function of the duration that said signal has been assigned to said finger.

19. The method of claim 18 wherein said percentage increases logarithmically as a function of the duration that said signal has been assigned to said finger.

20. The method of claim 18 wherein said percentage increases in discrete steps as a function of the duration that said signal has been assigned to said finger.

21. An apparatus comprising:
a rake receiver comprising a finger;
means for assigning a signal to said finger; and
means for de-assigning said signal from said finger when a measure of signal quality of said signal spends more than a percentage of time below a threshold, and for changing said percentage as a function of time.

22. The apparatus of claim 21 wherein said percentage changes as a function of the duration that said signal has been assigned to said finger.

23. The apparatus of claim 22 wherein said percentage increases logarithmically as a function of the duration that said signal has been assigned to said finger.

24. The apparatus of claim 22 wherein said percentage increases in discrete steps as a function of the duration that said signal has been assigned to said finger.

25. A method comprising:
assigning a signal to a finger of a rake receiver;
de-assigning said signal from said finger when a measure of signal quality of said signal spends more than a percentage of time below a threshold during an interval of time of a first length; and
changing said first length as a function of time.

26. The method of claim 25 wherein said first length changes as a function of the duration that said signal has been assigned to said finger.

27. The method of claim 26 wherein said first length increases logarithmically as a function of the duration that said signal has been assigned to said finger.

28. The method of claim 26 wherein said first length increases in discrete steps as a function of the duration that said signal has been assigned to said finger.

29. An apparatus comprising:
a rake receiver comprising a finger;
means for assigning a signal to said finger; and
means for de-assigning said signal from said finger when a measure of signal quality of said signal spends more than a percentage of time below a threshold during an interval of time of a first length, and for changing said first length as a function of time.

30. The apparatus of claim 29 wherein said first length changes as a function of the duration that said signal has been assigned to said finger.

31. The apparatus of claim 30 wherein said first length increases logarithmically as a function of the duration that said signal has been assigned to said finger.

32. The apparatus of claim 30 wherein said first length increases in discrete steps as a function of the duration that said signal has been assigned to said finger.

33. A receiver comprising:
an antenna for receiving a plurality of signals;
a radio front-end for receiving said plurality of signals;
a rake receiver comprising a finger;
means for assigning a signal to said finger; and
means for de-assigning said signal from said finger when a measure of signal quality of said signal crosses a threshold, and for changing said threshold as a function of time.

34. The receiver of claim 33 wherein said threshold changes as a function of the duration that said signal has been assigned to said finger.

35. A receiver comprising:
an antenna for receiving a plurality of signals;
a radio front-end for receiving said plurality of signals;
a rake receiver comprising a finger;
means for assigning a signal to said finger; and
means for de-assigning said signal from said finger when a time-average measure of signal quality of said signal crosses a threshold, and for changing the length of time in which said time-average measure of signal quality is determined as a function of time.

36. The apparatus of claim 35 wherein the length of time in which said time-average measure of signal quality is determined changes as a function of the duration that said signal has been assigned to said finger.

37. A receiver comprising:
an antenna for receiving a plurality of signals;
a radio front-end for receiving said plurality of signals;
a rake receiver comprising a finger;
means for assigning a signal to said finger; and
means for de-assigning said signal from said finger when a measure of signal quality of said signal spends more than a percentage of time below a threshold, and for changing said percentage as a function of time.

38. The apparatus of claim 37 wherein said percentage changes in discrete steps as a function of the duration that said signal has been assigned to said finger.

39. A receiver comprising:
an antenna for receiving a plurality of signals;
a radio front-end for receiving said plurality of signals;
a rake receiver comprising a finger;
means for assigning a signal to said finger; and means for de-assigning said signal from said finger when a measure of signal quality of said signal spends more than a percentage of time below a threshold during an interval of time of a first length, and for changing said first length as a function of time.

40. The apparatus of claim 39 wherein said first length changes as a function of the duration that said signal has been assigned to said finger.

* * * * *